(12) United States Patent
Johansson et al.

(10) Patent No.: US 12,541,196 B2
(45) Date of Patent: Feb. 3, 2026

(54) METHOD, ELECTRONIC DEVICE AND COMPUTER PROGRAM PRODUCT FOR REDUCING A CARBON DIOXIDE FOOTPRINT ASSOCIATED WITH A PRODUCTION PROCESS

(71) Applicant: SECO TOOLS AB, Fagersta (SE)

(72) Inventors: Daniel Johansson, Fagersta (SE); Soren Hagglund, Fagersta (SE); Gerrit Kremer, Fagersta (SE)

(73) Assignee: Seco Tools AB, Fagersta (SE)

( * ) Notice: Subject to any disclaimer, the term of this patent is extended or adjusted under 35 U.S.C. 154(b) by 530 days.

(21) Appl. No.: 17/922,910

(22) PCT Filed: Apr. 23, 2021

(86) PCT No.: PCT/EP2021/060675
§ 371 (c)(1),
(2) Date: Nov. 2, 2022

(87) PCT Pub. No.: WO2021/224029
PCT Pub. Date: Nov. 11, 2021

(65) Prior Publication Data
US 2023/0161335 A1   May 25, 2023

(30) Foreign Application Priority Data
May 6, 2020 (EP) ..................................... 20173161

(51) Int. Cl.
*G05B 19/418* (2006.01)
(52) U.S. Cl.
CPC ..... *G05B 19/4188* (2013.01); *G05B 19/4183* (2013.01); *G05B 19/4187* (2013.01)

(58) Field of Classification Search
CPC ............ G05B 19/4188; G05B 19/4183; G05B 19/4187; G05B 19/41865; G05B 2219/31414; Y02P 90/02; B23Q 15/12
See application file for complete search history.

(56) References Cited

U.S. PATENT DOCUMENTS 4,922,591 A * 5/1990 Campbell .......... B23Q 3/15546
483/902
8,214,249 B2  7/2012 King et al.
(Continued)

FOREIGN PATENT DOCUMENTS

CN      106094729 B    7/2018
CN      109954908 A    7/2019

OTHER PUBLICATIONS

Changle Tian, Guanghui Zhou, Junjie Zhang, Chao Zhang, Optimization of cutting parameters considering tool wear conditions in low-carbon manufacturing environment, Journal of Cleaner Production, vol. 226, 2019, pp. 706-719 (Year: 2019).*

(Continued)

*Primary Examiner* — Christopher E. Everett
(74) *Attorney, Agent, or Firm* — Corinne R. Gorski

(57) ABSTRACT

The disclosure relates to a method, an electronic device and a computer program product for reducing a carbon dioxide footprint associated with a production process. The carbon dioxide footprint has at least an amount of carbon dioxide emitted during the production process. The method includes the step of obtaining a parameter indicative of a selected cutting feature for production by a cutting tool, the step of obtaining a parameter indicative of a selected work-piece material for production by a cutting tool, the step of determining a set of cutting tools for production based on the obtained parameters, and the step of determining a cutting tool for production from the determined set of cutting tools (Continued)

based on carbon dioxide emission information data associated with each cutting tool in the determined set of cutting tools.

14 Claims, 5 Drawing Sheets

(56) References Cited

U.S. PATENT DOCUMENTS

| | | |
|---|---|---|
| 8,427,318 B2 | 4/2013 | Hamilton, II et al. |
| 2009/0307037 A1* | 12/2009 | King ................ G06Q 10/06375 705/7.23 |
| 2010/0127868 A1* | 5/2010 | Hamilton, II .......... G06Q 10/08 340/572.1 |
| 2013/0151303 A1 | 6/2013 | Kienzle |
| 2014/0135970 A1 | 5/2014 | Kaushal et al. |
| 2017/0139397 A1* | 5/2017 | Kawai ................. G05B 19/409 |

OTHER PUBLICATIONS

Li, Congbo, et al. "A quantitative approach to analyze carbon emissions of CNC-based machining systems." Journal of Intelligent Manufacturing 26 (2015): 911-922 (Year: 2015).*

Zhou, G., Lu, Q., Xiao, Z. et al. Ontology-based cutting tool configuration considering carbon emissions. Int. J. Precis. Eng. Manuf. 18, 1641-1657 (2017) (Year: 2017).*

Zhou et al. "Ontology-Based Cutting Tool Configuration Considering Carbon Emissions," International Journal of Precision Engineering and Manufacturing, Nov. 2017, vol. 18, No. 11, pp. 1641-1657.

* cited by examiner

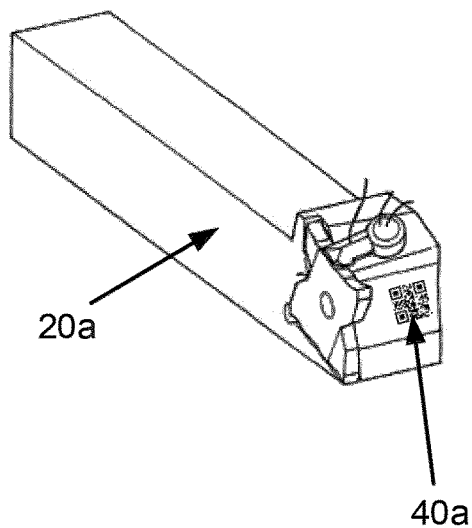
Fig. 1a
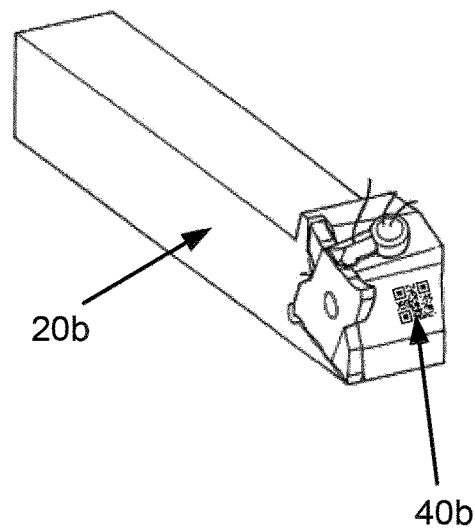
Fig. 1b
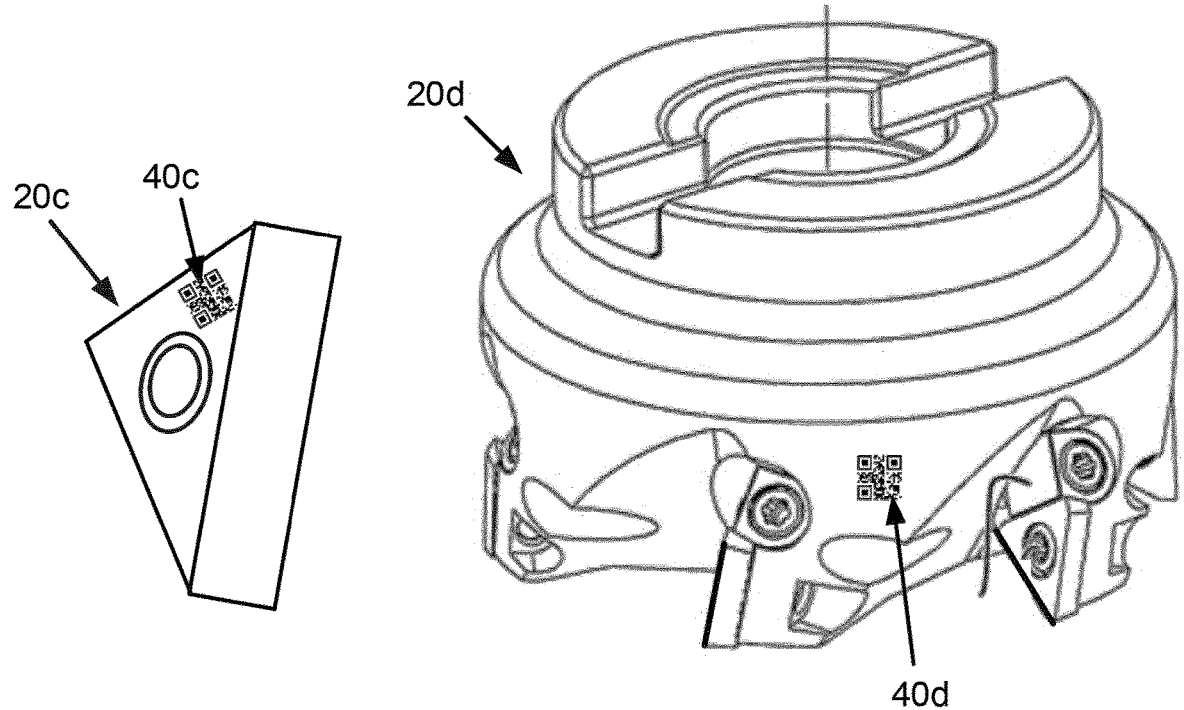
Fig. 1c
Fig 1d

METHOD, ELECTRONIC DEVICE AND COMPUTER PROGRAM PRODUCT FOR REDUCING A CARBON DIOXIDE FOOTPRINT ASSOCIATED WITH A PRODUCTION PROCESS

RELATED APPLICATION DATA

This application is a § 371 National Stage Application of PCT International Application No. PCT/EP2021/060675 filed Apr. 23, 2021 with priority to EP 20173161.9 filed May 6, 2020.

TECHNICAL FIELD

The present disclosure relates to a method, an electronic device and a computer program product for reducing a carbon dioxide footprint associated with a production process by a cutting tool.

BACKGROUND ART

Today a plurality of machine operations involves use of tools for processing material during machine operation. Tools for machine operations are often selected dependent on what kind of operation that is required for the processing by the tool during the machine operation. Also, factors such as production cost and production time are considered when selecting a tool for a machine operation.

One example of machine operations are operations by machines with cutting tools that are configured to remove chips from a piece of material during the machine operation by the cutting tool. In the example, the machine for cutting may require different cutting tools to perform different kinds of cutting operations during a production process. Hence, a cutting tool needs to be selected dependent on a desired cutting feature for production. The cutting tool also needs to be selected dependent on the work-piece material to be processed by the cutting tool in the production process.

The selection of a cutting tool is often made with respect to a combination of the production cost and production time, that are both desired to be kept at a minimum in order to process the material as cost effective as fast as possible.

SUMMARY

The selection of cutting tools can be manually or supported by a software application that selects a cutting tool dependent on e.g. the desired cutting feature and/or dependent on the work-piece material to be processed by the cutting tool in the production process.

A first drawback of current approaches is that the amount of carbon dioxide emitted during the production process by a cutting tool cannot be understood and hence, the cutting tool cannot be selected based on the amount of carbon dioxide emitted during the production process by the cutting tool.

A second drawback of current approaches is that the amount of carbon dioxide emitted before of the production process associated with a cutting tool cannot be understood and hence, the cutting tool cannot be selected based on the amount of carbon dioxide emitted before and during the production process by the cutting tool, in order to reduce a carbon dioxide footprint associated with a production process.

It is an object of the present disclosure to mitigate, alleviate or eliminate one or more of the above-identified deficiencies and disadvantages in the prior art and solve at least the above mentioned problem.

According to a first aspect there is provided a method for reducing a carbon dioxide footprint associated with a production process, wherein the carbon dioxide footprint comprises at least an amount of carbon dioxide emitted during the production process, the method comprising obtaining a parameter indicative of a selected cutting feature for production by a cutting tool, obtaining a parameter indicative of a selected work-piece material for production by a cutting tool, determining a set of cutting tools for production based on the obtained parameters, and determining a cutting tool for production from the determined set of cutting tools based on carbon dioxide emission information data associated with each cutting tool in the determined set of cutting tools.

Examples of selected cutting features for production by a cutting tool is a straight shoulder, a T-slot, a rectangular pocket, a hole, a cylindrical surface, or a radial groove. Other cutting features are also possible.

One advantage with this aspect is that the cutting tool for production is selected by comparing carbon dioxide emission information data associated with each cutting tool in the determined set of cutting tools, further dependent on the selected cutting feature and the selected work-piece material.

According to some embodiments, the method further comprises determining a set of cutting data parameters for the production process based on carbon dioxide emission information data associated with the set of cutting data parameters.

One advantage with this embodiment is that a machine can be programmed according to the cutting data parameters in order to process the selected work-piece material with the cutting tool for production with a reduced carbon dioxide footprint.

According to some embodiments, the method further comprises obtaining at least one limiting parameter and determining the set of cutting data parameters taking the at least one limiting parameter into account.

One advantage with this embodiment is that the set of cutting data parameters can be determined in respect of at least one limitation in the production process.

According to some embodiments, the production process comprises plural operations by different cutting tools and the carbon dioxide footprint comprises at least a total amount of carbon dioxide emitted during the production process by the different cutting tools, and wherein determining each cutting tool for production for each operation in the production process is based on a carbon dioxide contribution by each cutting tool in each operation for reducing a total carbon dioxide footprint for the production process.

One advantage with this embodiment is that plural cutting tools for production are selected by comparing carbon dioxide emission information data associated with each cutting tool in the determined set of cutting tools, dependent on the different cutting features of the plural operations and the selected work-piece material.

According to some embodiments, the carbon dioxide emission information data is based on at least any of a determined time when the cutting tool is required to process the work-piece material; a determined power required to process the work-piece material by the cutting tool; and an energy source composition of one or a plurality of energy sources powering the production process.

One advantage with this embodiment is that factors that affect the amount of required energy, and/or the amount of carbon dioxide which is produced is comprised in the carbon dioxide emission information associated with the cutting tool.

According to some embodiments, the carbon dioxide footprint further comprises an amount of carbon dioxide emitted before the production process, wherein the carbon dioxide emission information data is based on at least any of an amount of carbon dioxide emitted during manufacturing of the cutting tool, an amount of carbon dioxide emitted during transport of the cutting tool, and an accumulated amount of carbon dioxide emitted during previous processing by the cutting tool.

One advantage with this embodiment is that a total amount of carbon dioxide emitted before the production process can be taken in consideration when determining the cutting tool for production.

According to some embodiments, the carbon dioxide emission information data associated with each cutting tool is stored in a memory and is associated with a unique machine readable code of an identification marker of each cutting tool.

One advantage with this embodiment is that each cutting tool is associated with carbon dioxide emission information data and the unique machine readable code enables efficient management of the carbon dioxide emission information data for each tool, and further eliminates the risk of human errors associated with information read by a human such as mixing different tools with different carbon dioxide data.

According to some embodiments, the cutting tool for production is determined by comparing the carbon dioxide emission information data for each cutting tool in the set of tools for production, and selecting the cutting tool with the lowest amount of carbon dioxide emitted during the production process, or selecting the cutting tool with the lowest total amount of carbon dioxide emitted during the production process and during the manufacturing and/or transport of the cutting tool.

One advantage with this embodiment is that the cutting tool for production can be determined based on the lowest amount of carbon dioxide emitted during the production but also based on the amount of carbon dioxide emitted during the manufacturing and/or transport of the cutting tool.

According to some embodiments, the set of cutting tools for production is determined based on available cutting tools from a portfolio of cutting tools, wherein each cutting tool is associated with respective carbon dioxide emission information data.

One advantage with this embodiment is that available cutting tools can be limited to a portfolio of cutting tools comprising certain cutting tools e.g. dependent on availability of the cutting tools at a certain location, e.g. currently available cutting tools present at a production location, or dependent on the availability of the cutting tool within a certain time period after ordering of the cutting tool from a manufacturer or supplier of cutting tools.

According to some embodiments, the set of cutting tools for production is determined from a group of available cutting tools and each available cutting tool is identified by reading, by a reader device, an identification marker at each cutting tool wherein the identification marker is a machine readable code associated with the cutting tool.

One advantage with this embodiment is that e.g. an operator of a machine can use a reader device and identify the currently available cutting tools at a production location.

According to a second aspect there is provided an electronic device for reducing a carbon dioxide footprint associated with a production process, wherein the carbon dioxide footprint comprises at least an amount of carbon dioxide emitted during the production process, the electronic device comprises a processing circuitry configured to cause the electronic device to obtain a parameter indicative of a selected cutting feature for production by a cutting tool, obtain a parameter indicative of a selected work-piece material for production by a cutting tool, determine a set of cutting tools for production based on the obtained parameters, and determine a cutting tool for production from the determined set of cutting tools based on carbon dioxide emission information data associated with each cutting tool in the determined set of cutting tools.

One advantage with this aspect is that the cutting tool for production is selected by comparing carbon dioxide emission information data associated with each cutting tool in the determined set of cutting tools, dependent on the selected cutting feature and the selected work-piece material.

According to some embodiments, the processing circuitry is further configured to determine a set of cutting data parameters for the production process based on carbon dioxide emission information data associated with the set of cutting data parameters.

One advantage with this embodiment is that a machine can be programmed according to the cutting data parameters in order to process the selected work-piece material with the cutting tool for production with a reduced carbon dioxide footprint.

According to some embodiments, the processing circuitry is further configured to cause the electronic device to obtain at least one limiting parameter. The processing circuitry is further configured to determine a set of cutting data parameters taking the at least one limiting parameter into account.

One advantage with this embodiment is that the set of cutting data parameters can be determined in respect of at least one limitation in the production process.

According to some embodiments, the carbon dioxide emission information data associated with each cutting tool is stored in a memory and is associated with a unique machine readable code of an identification marker of each cutting tool.

One advantage with this embodiment is that each cutting tool is associated with carbon dioxide emission information data and the unique machine readable code enables efficient management of the carbon dioxide emission information data for each tool, and further eliminates the risk of human errors associated with information read by a human such as mixing different tools with different carbon dioxide data.

According to some embodiments, any of the electronic device further comprises a reader device configured to read a machine readable code, arranged at a cutting tool, wherein the reader device is operatively connected to the processing circuitry, and the processing circuitry is further configured to cause the electronic device to determine the set of cutting tools for production from a group of available cutting tools wherein each available cutting tool is identified by, reading, by the reader device, an identification marker at each cutting tool wherein the identification marker is a machine readable code associated with the cutting tool.

One advantage with this embodiment is that e.g. an operator of a machine can use a reader device and identify the currently available cutting tools at a production location.

According to some embodiments, the processing circuitry of the electronic device is further configured to obtain the carbon dioxide emission information data associated with the cutting tool from a memory based on the machine readable code associated with the cutting tool.

One advantage with this embodiment is that carbon dioxide emission information data is accessible by the electronic device and can be used for determining the cutting tool for production.

According to a third aspect there is provided a computer program product comprising a non-transitory computer readable medium, having thereon a computer program comprising program instructions, the computer program being loadable into a processing circuitry and configured to cause execution of the method when the computer program is run by the processing circuitry.

Effects and features of the second and third aspects are to a large extent analogous to those described above in connection with the first aspect. Embodiments mentioned in relation to the first aspect are largely compatible with the second and third aspects.

The present disclosure will become apparent from the detailed description given below. The detailed description and specific examples disclose preferred embodiments of the disclosure by way of illustration only. Those skilled in the art understand from guidance in the detailed description that changes, and modifications may be made within the scope of the disclosure.

Hence, it is to be understood that the herein disclosed disclosure is not limited to the particular component parts of the device described or steps of the methods described since such device and method may vary. It is also to be understood that the terminology used herein is for purpose of describing particular embodiments only and is not intended to be limiting. It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTIONS OF THE DRAWINGS

The above objects, as well as additional objects, features and advantages of the present disclosure, will be more fully appreciated by reference to the following illustrative and non-limiting detailed description of example embodiments of the present disclosure, when taken in conjunction with the accompanying drawings.

FIGS. 1a-d illustrates example cutting tools according to embodiments of the present disclosure.

DETAILED DESCRIPTION

Figure 2:
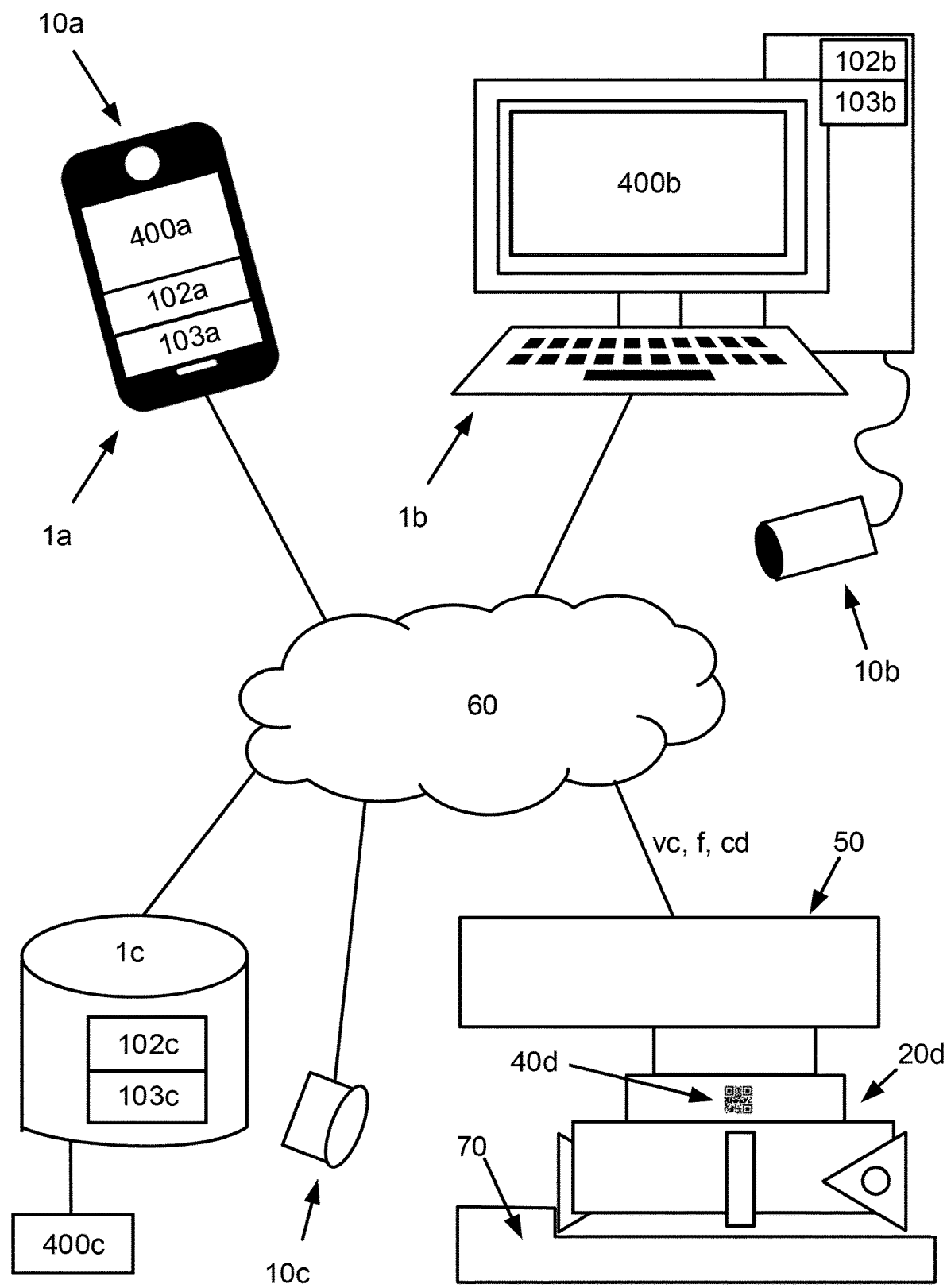
FIG. 2 illustrates example electronic devices and a machine connectable via a communication network according to an embodiment of the present disclosure.

The present disclosure will now be described with reference to the accompanying drawings, in which preferred example embodiments of the disclosure are shown. The disclosure may, however, be embodied in other forms and should not be construed as limited to the herein disclosed embodiments. The disclosed embodiments are provided to fully convey the scope of the disclosure to the skilled person.

The production cost and production time factors, that are considered when selecting a cutting tool to remove chips from a piece of material, are also associated with a certain amount of energy consumption.

The energy that is consumed during the production process by the cutting tool is often associated with a certain amount of carbon dioxide emitted during the production process. How the cutting tool is processing the material during the machine operation often affects the amount of carbon dioxide emitted during the production process. The energy sources that provide energy to the production process by the cutting tool also affects the amount of carbon dioxide emitted during the production process.

The inventors have realized that it is sometimes desired to reduce or minimize the amount of carbon dioxide emitted during the production process by a cutting tool.

The inventors have also realized that it is sometimes desired to reduce the total amount of carbon dioxide emitted during the lifetime of a cutting tool, which includes reducing the amount of carbon dioxide emitted during usage of the cutting tool in production, but also the amount carbon dioxide emitted during the e.g. manufacturing, handling, transporting and maintaining the cutting tool etc.

Hence, the inventors have realized that there is a desire to reduce the carbon dioxide emitted during the production process by a cutting tool. The inventors have also realized that it is desired to consider the total amount of carbon dioxide that has been, or will be, emitted during the whole lifetime of the cutting tool in order to reduce the total amount of carbon dioxide.

As mentioned above, a first drawback of current approaches is that the amount of carbon dioxide emitted during the production process by a cutting tool cannot be understood and hence, the cutting tool for production cannot be selected based on the amount of carbon dioxide emitted during the production process by the cutting tool.

Also as mentioned above, a second drawback of current approaches is that the amount of carbon dioxide emitted before of the production process associated with a cutting tool cannot be understood and hence, the cutting tool for production cannot be selected based on the amount of carbon dioxide emitted before and during the production process by the cutting tool, in order to reduce a carbon dioxide footprint associated with a production process.

It is an object of the present disclosure to mitigate, alleviate or eliminate one or more of the above-identified deficiencies and disadvantages in the prior art and solve at least the above mentioned problem.

Today a plurality of machine operations involves the use of tools that are processing a material during the machine operation. In the following description, cutting tools are disclosed. Example machine operations are related to machines with cutting tools that are used to remove chips from a work-piece material during the machine operation. Work-piece material, as described herein, may typically comprise a work-piece of metal to be processed, but the material may be any other material such as a plastic, stone or wood material. Machines, as described herein, may typically comprise a milling machine, a turning machine, a hole making machine, a threading machine or any other machine configured for processing a piece of material by a cutting tool.

FIGS. 1a-d illustrates example cutting tools 20a,20b,20c, 20d according to an embodiment of the present disclosure. According to some embodiments the cutting tool 20a,20b, 20c,20d is any of a cutting insert, a cutting edge, a milling cutting tool, a drilling cutting tool, a drill chuck, a milling cutter chuck or a tool holder. The cutting tool 20a,20b,20c, 20d comprising an identification marker 40a,40b,40c,40d arranged at the cutting tool 20a,20b,20c,20d.

According to some embodiments, the identification marker 40a,40b,40c,40d is at least any of, or a combination of at least any of, a proprietary machine readable code, an open source machine readable code, a two dimensional code, a three dimensional code, an image a Quick Response code, a High Capacity Colored Two Dimensional Code, a European Article Number code, a Data Matrix code or a MaxiCode.

According to some embodiments, the identification marker 40a,40b,40c,40d is etched at the cutting tool 20a, 20b,20c,20d. According to some embodiments the identification marker 40a,40b,40c,40d is a sticker attached at the cutting tool 20a,20b,20c,20d. According to some embodiments the identification marker 40a,40b,40c,40d is painted at the cutting tool 20a,20b,20c,20d.

FIG. 2 illustrates example electronic devices 1a,1b,1c and a machine 50 connectable via a communication network 60 according to an embodiment of the present disclosure.

According to some embodiments the electronic device 1a,1b,1c further comprises a reader device 10a,10b,10c, as illustrated in FIG. 2. According to some embodiments, the reader device 10a,10b,10c is any of a camera based reader, a video camera reader, a pen-type reader with photodiodes, a laser scanner, a charge-coupled device reader or a cell phone camera. According to some embodiments, the reader device 10a,10b,10c is a component integrated in an electronic device or a stand-alone component. The reader device 10a,10b,10c is configured to read a machine readable code, arranged at the cutting tool 20a,20b,20c,20d. According to some embodiments the identification marker 40a,40b,40c, 40d, arranged at the cutting tool 20a,20b,20c,20d, is a machine readable code. According to some embodiments the identification marker 40a,40b,40c,40d is associated with the cutting tool 20a,20b,20c,20d.

According to some embodiments, the electronic device is a portable electronic device 1a. According to some embodiments, electronic device is a local electronic device 1b. In an example the electronic device 1b is a laptop or a stationary computer. According to some embodiments the electronic device is a remote electronic device 1c. According to some embodiments, the electronic device 1a,1b,1c is configured to be connected to a communication network 60.

FIG. 2 illustrates an electronic device 1a in form of a smartphone, tablet, cellular phone, feature phone or any portable electronic device. In one example, as illustrated in FIG. 2, the reader device 10a is the camera of a smartphone 1a. In the example, the electronic device 1a is a smartphone that is held by the machine operator when preparing cutting tools 20a,20b,20c,20d for machine operation. The electronic device can also be a local electronic device 1b at a production location connectable to a machine 50 via a communication network 60 as illustrated in FIG. 2. In one example, illustrated in FIG. 2, the reader device 10b is a stand-alone reader device connected to the electronic device 1b. According to some embodiments the electronic device is a remote server 1c connected to a reader device 10c via the communication network 60 as illustrated in FIG. 2.

According to some embodiments the communication network 60 is a wireless communication network. According to some embodiments, the wireless communication network is a standardized wireless local area network such as a Wireless Local Area Network, WLAN, Bluetooth™, ZigBee, Ultra-Wideband, UWB, Radio Frequency Identification, RFID, or similar network. According to some embodiments, the wireless communication network is a standardized wireless wide area network such as a Global System for Mobile Communications, GSM, Extended GSM, General Packet Radio Service, GPRS, Enhanced Data Rates for GSM Evolution, EDGE, Wideband Code Division Multiple Access, WCDMA, Long Term Evolution, LTE, Narrowband-IoT, 5G, Worldwide Interoperability for Microwave Access, WiMAX or Ultra Mobile Broadband, UMB or similar network. According to some embodiments, the wireless communication network can also be a combination of both a wireless local area network and a wireless wide area network. According to some embodiments, communication network 60 can be a combination of a wired communication network and a wireless communication network. According to some embodiments, the communication network 60 is defined by common Internet Protocols.

Figure 5:
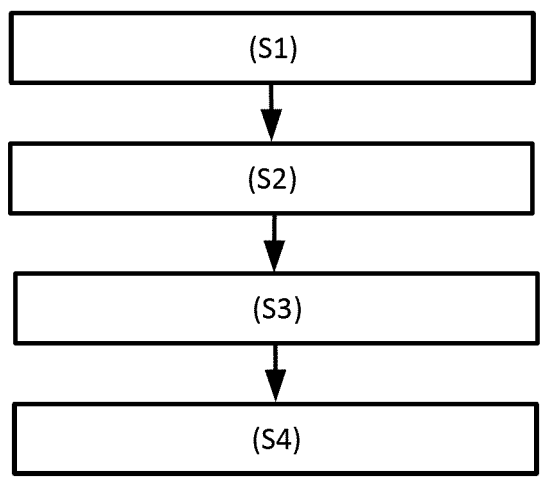
FIG. 5 illustrates a flow chart of example method steps according to an embodiment of the present disclosure.
Figure 6:
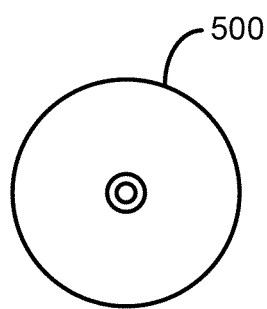
FIG. 6 illustrates an example computer program product according to embodiments of the present disclosure.

The first aspect of this disclosure shows a method for reducing a carbon dioxide footprint associated with a production process, wherein the carbon dioxide footprint comprises at least an amount of carbon dioxide emitted during the production process. FIG. 5 illustrates a flow chart of example method steps according to embodiments of the present disclosure. The method comprising the step of S1 in which a parameter indicative of a selected cutting feature is obtained for production by a cutting tool 20a,20b,20c,20d, and the step of S2 in which a parameter indicative of a selected work-piece material is obtained for production by a cutting tool 20a,20b,20c,20d. The method further comprising the step of S3 in which a set of cutting tools 20a,20b, 20c,20d for production is determined based on the obtained parameters, and the step of S4 in which a cutting tool for production is determined from the determined set of cutting tools 20a,20b,20c,20d based on carbon dioxide emission information data associated with each cutting tool 20a,20b, 20c,20d in the determined set of cutting tools 20a,20b,20c, 20d.

Hence, with this aspect the cutting tool for production is selected by comparing carbon dioxide emission information data associated with each cutting tool in the determined set of cutting tools, dependent on the selected cutting feature and the selected work-piece material.

According to some embodiments the parameter indicative of a selected cutting feature and/or the parameter indicative of a selected work-piece material is obtained via at least any of a manual input of the parameter via a user interface 400a,400b,400c of an electronic device 1a,1b,1c, or via an automatic input of the parameter by a software application that is run by the electronic device 1a,1b,1c. Example user interfaces 400a,400b,400c are illustrated in FIG. 2.

In an example, the input of the parameter indicative of a selected cutting feature and/or the parameter indicative of a selected work-piece material is obtained by input by a user interacting via a user interface 400a,400b,400c in form of a web browser, a software program, or an application run on e.g. a computer or a smartphone.

According to some embodiments, determining the set of cutting tools 20a,20b,20c,20d for production comprising determining the recommended cutting tools 20a,20b,20c, 20d for production based on the obtained parameters.

According to some embodiments, determining the set of cutting tools 20a,20b,20c,20d for production comprising determining the possible cutting tools 20a,20b,20c,20d that can be used for production based on the obtained parameters. According to some embodiments the parameter indicative of a selected cutting feature and/or the parameter indicative of a selected work-piece material limits the possible cutting tools 20a,20b,20c,20d that can be used for production.

According to some embodiments, determining the cutting tool for production comprising selecting the most suitable cutting tool 20a,20b,20c,20d for reducing the carbon dioxide footprint of the production process.

According to some embodiments the carbon dioxide emission information data associated with each cutting tool 20a,20b,20c,20d is obtained from a memory 103a,103b, 103c.

According to some embodiments carbon dioxide emission information data is data comprising different parameters associated with different usage of the cutting tool. According to some embodiments carbon dioxide emission information data is data associated with different amounts of energy required for the different usage of the tool. According to some embodiments carbon dioxide emission information data is data comprising predetermined amounts of carbon dioxide emitted that is associated with the cutting tool. According to some embodiments carbon dioxide emission information data is data comprising estimated amounts of carbon dioxide to be emitted dependent on different usage of the cutting tool. According to some embodiments the different usage of the cutting tool is further dependent on machine properties of the cutting tool for production.

According to some embodiments the method further comprises the step of determining a set of cutting data parameters for the production process based on carbon dioxide emission information data associated with the set of cutting data parameters.

Hence, with this embodiment a machine can be programmed according to the cutting data parameters in order to process the selected work-piece material with the cutting tool for production with a reduced carbon dioxide footprint.

According to some embodiments, the method further comprises obtaining at least one limiting parameter and determining the set of cutting data parameters taking the at least one limiting parameter into account.

Hence, with this embodiment the set of cutting data parameters can be determined in respect of at least one limitation in the production process.

According to some embodiments the set of cutting data parameters includes at least one of depth of cut AP, working engagement AE, feed/revolution FN, feed/tooth FZ and cutting speed VC.

According to some embodiments the at least one limiting parameter includes at least one of machine or other set-up constraints, maximum tolerances, maximum surface roughness, maximum or desired production time, maximum production rate, maximum production cost, and desired tool wear rate.

According to some embodiments the at least one limiting parameter is obtained via at least any of a manual input of the parameter via a user interface 400a,400b,400c of an electronic device 1a,1b,1c, or via an automatic input of the parameter by a software application that is run by the electronic device 1a,1b,1c. Example user interfaces 400a, 400b,400c are illustrated in FIG. 2.

In an example, the input of the at least one limiting parameter is obtained by input by a user interacting via a user interface 400a,400b,400c in form of a web browser, a software program, or an application run on e.g. a computer or a smartphone.

According to some embodiments the method further comprises outputting the set of cutting data parameters via the user interface 400a,400b,400c of the electronic device 1a,1b,1c.

According to some embodiments the method further comprises outputting the set of cutting data parameters as input data to a machine 50 configured to process work-piece material 70 by the cutting tool 20a,20b,20c,20d. According to some embodiment the machine 50 is connectable to the electronic device 1a,1b,1c. In an example, as illustrated in FIG. 2, the machine 50 is connected to the electronic device 1a,1b,1c via the communication network 60. According to some embodiments the set of cutting data parameters is configured to be sent via the communication network 60 to the machine 50.

According to some embodiments the cutting tool for production is processing the selected work-piece material according to the one or more machine properties for reducing the carbon dioxide footprint for the production process. In the example as illustrated in FIG. 2, the machine 50 is configured to process work-piece material 70 by the cutting tool 20d with the set of cutting data parameters AP, AE, FN, FZ, VC for reducing the carbon dioxide footprint of the production process.

According to some embodiments the production process comprises plural operations by different cutting tools 20a, 20b,20c,20d and the carbon dioxide footprint comprises at least a total amount of carbon dioxide emitted during the production process by the different cutting tools 20a,20b, 20c,20d, and wherein determining each cutting tool for production for each operation in the production process is based on a carbon dioxide contribution by each cutting tool 20a,20b,20c,20d in each operation for reducing a total carbon dioxide footprint for the production process.

Hence, with this embodiment plural cutting tools for production are selected by comparing carbon dioxide emission information data associated with each cutting tool in the determined set of cutting tools, dependent on the different cutting features of the plural operations and the selected work-piece material.

According to some embodiments the production process comprises plural operations by different cutting tools 20a, 20b,20c,20d, and obtaining a parameter indicative of a selected cutting feature for production by a cutting tool 20a,20b,20c,20d comprises obtaining at least one parameter indicative of a selected cutting feature for production by a cutting tool 20a,20b,20c,20d for each operation of the plural operations.

According to some embodiments the production process comprises plural operations by different cutting tools 20a, 20b,20c,20d, and determining a set of cutting tools 20a,20b, 20c,20d for production comprises determining set of cutting tools 20a,20b,20c,20d required for different operations of the plural operations based on the obtained parameters for each operation of the plural operations.

In an example a production process comprises a first operation by a first cutting tool, a second operation by a second cutting tool and a third operation by a third cutting tool. In the example the first operation by the first cutting tool contributes with x amount of carbon dioxide, the second operation by the second cutting tool contributes with y amount of carbon dioxide and the third operation by the third cutting tool contributes with z amount of carbon dioxide. In the example the carbon dioxide contribution by each cutting tool is x, y and z and the total carbon dioxide footprint for the production process is hence x+y+z. In the example, each cutting tool 20a,20b,20c,20d can hence contribute with different carbon dioxide amounts, and by e.g. determining a first cutting tool with a very low carbon dioxide amount x, a second cutting tool with a low carbon dioxide amount y and a third cutting tool with a high carbon dioxide amount z, the total carbon dioxide footprint for the production process can be reduced, compared to e.g. determining a first, second and third cutting tool each contributing with a medium carbon dioxide amount. This means that even if one of the cutting tools contributes with a high carbon dioxide amount, in view of the whole production process, the total carbon dioxide footprint for the whole production process can be reduced if the other cutting tools contributes with a lower carbon dioxide amount.

According to some embodiments the production process comprises plural operations by different cutting tools, and a set of cutting data parameters is determined for each operation. The set of cutting data parameters for each cutting tool for production for each operation is determined so to reduce the total carbon dioxide footprint for the production process.

According to some embodiments the set of cutting data parameters includes at least one of depth of cut AP, working engagement AE, feed/revolution FN, feed/tooth FZ and cutting speed VC.

In an example a production process comprises a first operation by a determined cutting tool $20a, 20b, 20c, 20d$ for production with a first set of cutting data parameters, a second operation by a determined cutting tool $20a, 20b, 20c, 20d$ for production with a second set of cutting data parameters and a third operation by a determined cutting tool $20a, 20b, 20c, 20d$ for production with a third set of cutting data parameters. In the example the first operation with the first set of cutting data parameters contributes with u amount of carbon dioxide, the second operation with the second set of cutting data parameters contributes with v amount of carbon dioxide and the third operation with the third set of cutting data parameters contributes with w amount of carbon dioxide. In the example the carbon dioxide contribution by each operation is u, v and w and the total carbon footprint for the production process is hence u+v+w. In the example, each set of cutting data parameters can hence contribute with different amounts of carbon dioxide, and by e.g. determining a first set of cutting data parameters with a very low contribution of carbon dioxide u, a second set of cutting data parameters with a low contribution of carbon dioxide v and a third set of cutting data parameters with a high contribution of carbon dioxide w, the total carbon dioxide footprint for the production process can be reduced, compared to e.g. determining a first, second and third set of cutting data parameters each contributing with a medium amount of carbon dioxide. This means that even if one of the set of cutting data parameters contributes with a high amount of carbon dioxide, in view of the whole production process, the total carbon dioxide footprint for the whole production process can be reduced if other sets of cutting data parameters contributes with a lower amount of carbon dioxide.

In an example the production process comprises a plurality of operations by a plurality of determined tools $20a, 20b, 20c, 20d$ for production. A limiting parameter indicating a maximum production time is entered via a user interface $400a, 400b, 400c$. The processing circuitry $102a, 102b, 102c$ will determine a set of cutting data parameters for each operation, taking the maximum production time into account, that minimizes the total carbon dioxide footprint for the production process. The sets of cutting data parameters will be determined so that tools with a high manufacturing carbon dioxide footprint will be used with a conservative set of cutting data parameters, and tools with a low manufacturing carbon dioxide footprint will be used with a set of higher cutting data parameters. In this way, the total carbon dioxide footprint will be minimized during the production process performed within the maximum allowed production time.

According to some embodiments the carbon dioxide emission information data is based on at least any of a determined time when the cutting tool $20a, 20b, 20c, 20d$ is required to process the work-piece material, a determined power required to process the work-piece material by the cutting tool $20a, 20b, 20c, 20d$, and an energy source composition of one or a plurality of energy sources powering the production process.

Hence, with this embodiment factors that affect the amount of required energy, and/or the amount of carbon dioxide required to produce the energy is comprised in the carbon dioxide emission information associated with the cutting tool.

In an example different regions and/or countries have different energy source compositions, or energy mix, that needs to be taken in consideration. In an example, the energy source composition may be a mix of both energy sources that contributes to a higher carbon dioxide footprint and energy sources that contributes to a lower carbon dioxide footprint.

According to some embodiments wherein the carbon dioxide footprint further comprises an amount of carbon dioxide emitted before the production process, wherein the carbon dioxide emission information data is based on at least any of an amount of carbon dioxide emitted during manufacturing of the cutting tool $20a, 20b, 20c, 20d$, an amount of carbon dioxide emitted during transport of the cutting tool $20a, 20b, 20c, 20d$, and an accumulated amount of carbon dioxide emitted during previous processing by the cutting tool $20a, 20b, 20c, 20d$.

Hence, with this embodiment a total amount of carbon dioxide emitted before the production process can be taken in consideration when determining the cutting tool for production.

In an example, using a cutting tool $20a, 20b, 20c, 20d$ associated with a low amount of carbon dioxide emitted when the cutting tool $20a, 20b, 20c, 20d$ was manufactured, in a process requiring a high amount of carbon dioxide during the production process, can leave a total carbon dioxide footprint that is less or equal to using a cutting tool $20a, 20b, 20c, 20d$ associated with a high amount of carbon dioxide emitted when the cutting tool $20a, 20b, 20c, 20d$ was manufactured in a process requiring a low amount of carbon dioxide during the production process.

In an example, using a cutting tool $20a, 20b, 20c, 20d$ associated with a low amount of carbon dioxide emitted during transport of the cutting tool $20a, 20b, 20c, 20d$, in a process requiring a high amount of carbon dioxide during the production process, can leave a total carbon dioxide footprint that is less or equal to using a cutting tool $20a, 20b, 20c, 20d$ associated with a high amount of carbon dioxide emitted during transport of the cutting tool $20a, 20b, 20c, 20d$ in a process requiring a low amount of carbon dioxide during the production process.

Figure 4:
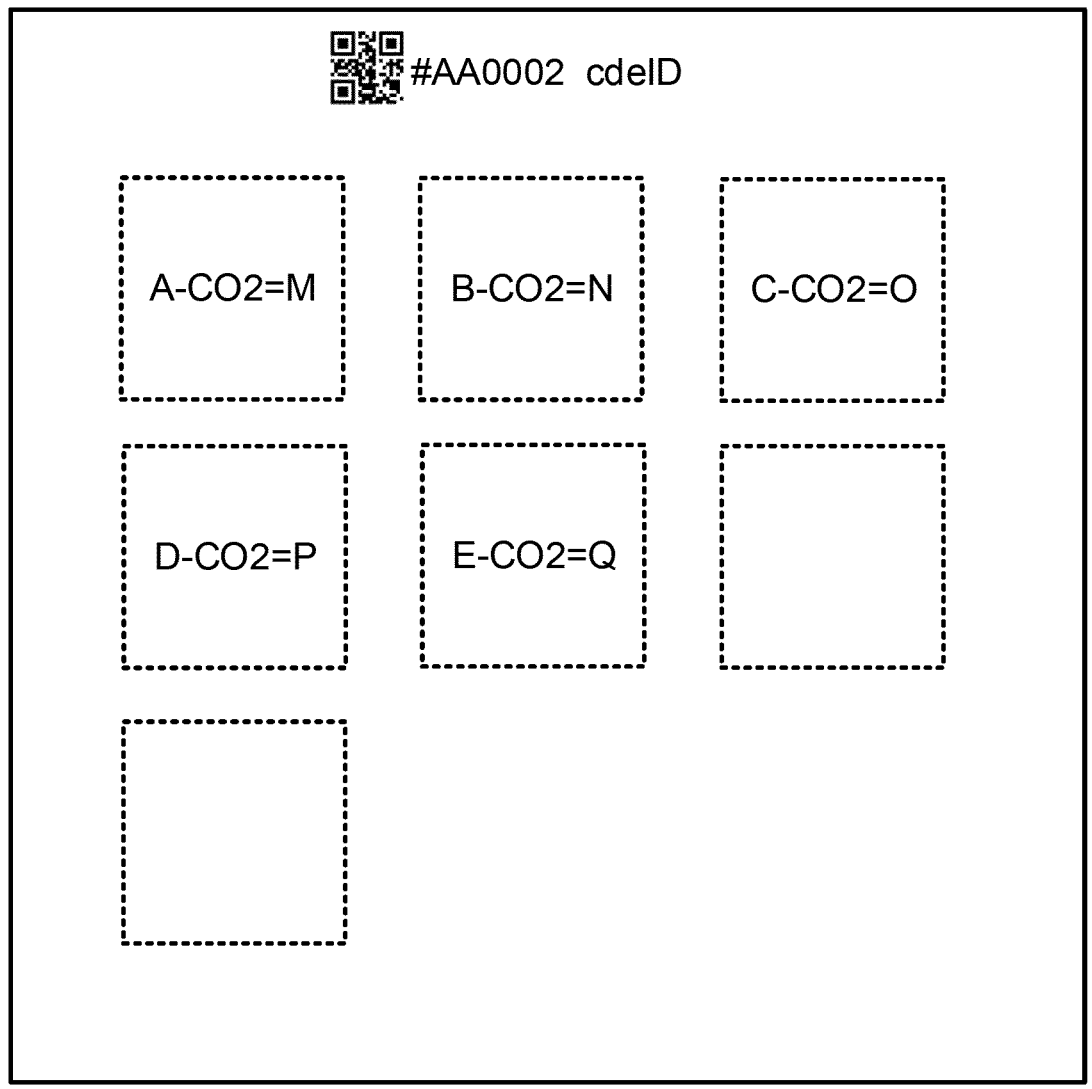
FIG. 4 illustrates example schematic data of amounts of carbon dioxide emitted that are associated with a cutting tool according to embodiments of the present disclosure.

FIG. 4 illustrates example schematic data of amounts of carbon dioxide emitted that are associated with a cutting tool. In the example as illustrated in FIG. 4 different amounts of carbon dioxide emitted before the production process is disclosed. In the example the amount of carbon dioxide A-CO2=M is the amount of carbon dioxide emitted during manufacturing of the cutting tool, the amounts of carbon dioxide B-CO2=N, C-CO2=O, D-CO2=P and E=CO2=Q are different accumulated amounts of carbon dioxide emitted during previous processing by the cutting tool. In the example, the total amount of carbon dioxide emitted before the production process is hence M+N+O+P+Q.

According to some embodiments the carbon dioxide emission information data associated with each cutting tool 20a,20b,20c,20d is stored in a memory 103a,103b,103c and is associated with a unique machine readable code of an identification marker 40a,40b,40c,40d of each cutting tool 20a,20b,20c,20d.

Hence, with this embodiment each cutting tool is associated with carbon dioxide emission information data and the unique machine readable code enables efficient management of the carbon dioxide emission information data for each tool, and further eliminates the risk of human errors associated with information read by a human such as mixing different tools with different carbon dioxide data.

In an example, the carbon dioxide emission information associated with a cutting tool can be managed, e.g. updated dependent on the usage of the cutting tool.

According to some embodiments the cutting tool for production is determined by comparing the carbon dioxide emission information data for each cutting tool 20a,20b,20c, 20d in the set of tools for production, and selecting the cutting tool 20a,20b,20c,20d with the lowest amount of carbon dioxide emitted during the production process or selecting the cutting tool 20a,20b,20c,20d with the lowest total amount of carbon dioxide emitted during the production process and during the manufacturing of the cutting tool 20a,20b,20c,20d.

Hence, with this embodiment the cutting tool for production can be determined based on the lowest amount of carbon dioxide emitted during the production but also based on the amount of carbon dioxide emitted during the manufacturing of the cutting tool.

According to some embodiments the cutting tool for production is determined by comparing the carbon dioxide emission information data for each cutting tool 20a,20b,20c, 20d in the set of cutting tools 20a,20b,20c,20d for production to select the cutting tool 20a,20b,20c,20d with the lowest amount of total carbon dioxide emitted during the cutting tool 20a,20b,20c,20d lifetime.

According to some embodiments the set of cutting tools 20a,20b,20c,20d for production is determined based on available cutting tools 20a,20b,20c,20d from a portfolio of cutting tools 20a,20b,20c,20d, wherein each cutting tool 20a,20b,20c,20d is associated with respective carbon dioxide emission information data.

Hence, with this embodiment available cutting tools can be limited to a portfolio of cutting tools comprising certain cutting tools e.g. dependent on availability of the cutting tools at a certain location, e.g. currently available cutting tools present at a production location, or dependent on the availability of the cutting tool within a certain time period after ordering of the cutting tool from a manufacturer or supplier of cutting tools.

According to some embodiments the portfolio of cutting tools 20a,20b,20c,20d comprising available cutting tools 20a,20b,20c,20d by a manufacturer of cutting tools 20a,20b, 20c,20d wherein the set of cutting tools 20a,20b,20c,20d for production is determined based on the selected cutting feature, the selected work-piece material, and further based on the availability of the cutting tools 20a,20b,20c,20d available for ordering.

According to some embodiments the portfolio of cutting tools 20a,20b,20c,20d comprising currently available cutting tools 20a,20b,20c,20d at a production location wherein the set of cutting tools 20a,20b,20c,20d for production is determined based on the selected cutting feature and the selected work-piece material that are available.

According to some embodiments the set of cutting tools 20a,20b,20c,20d for production is determined from a group of available cutting tools 20a,20b,20c,20d and each available cutting tool 20a,20b,20c,20d is identified by reading, by a reader device 10a,10b,10c, an identification marker 40a, 40b,40c,40d at each cutting tool 20a,20b,20c,20d wherein the identification marker 40a,40b,40c,40d is a machine readable code associated with the cutting tool 20a,20b,20c, 20d.

Hence, with this embodiment e.g. an operator of a machine 50 can use a reader device 10a,10b,10c and identify the currently available cutting tools 20a,20b,20c,20d at a production location.

In an example, an operator of a machine 50 can use the reader device 10a,10b,10c to identify currently available cutting tools 20a,20b,20c,20d in a stock of cutting tools, or identify currently available cutting tools 20a,20b,20c,20d present in the vicinity of a machine 50, and based on the set of cutting tools 20a,20b,20c,20d identified by the reader device 10a,10b,10c, determine the cutting tool for production.

According to some embodiments the carbon dioxide emission information data associated with each cutting tool 20a,20b,20c,20d is obtained by, reading, by a reader device 10a,10b,10c, an identification marker 40a,40b,40c,40d at the cutting tool 20a,20b,20c,20d wherein the identification marker 40a,40b,40c,40d is a machine readable code associated with the cutting tool 20a,20b,20c,20d and obtaining the carbon dioxide emission information data associated with the cutting tool 20a,20b,20c,20d from the memory 103a,103b,103c.

The second aspect of this disclosure shows an electronic device 1a,1b,1c for reducing a carbon dioxide footprint associated with a production process, wherein the carbon dioxide footprint comprises at least an amount of carbon dioxide emitted during the production process. The electronic device 1a,1b,1c comprises a processing circuitry 102a,102b,102c configured to cause the electronic device 1a,1b,1c to obtain a parameter indicative of a selected cutting feature for production by a cutting tool 20a,20b,20c, 20d, obtain a parameter indicative of a selected work-piece material for production by a cutting tool 20a,20b,20c,20d. The processing circuitry 102a,102b,102c is further configured to cause the electronic device 1a,1b,1c to determine a set of cutting tools 20a,20b,20c,20d for production based on the obtained parameters, and determine a cutting tool for production from the determined set of cutting tools 20a,20b, 20c,20d based on carbon dioxide emission information data associated with each cutting tool 20a,20b,20c,20d in the determined set of cutting tools 20a,20b,20c,20d.

Hence, with this aspect the cutting tool for production is selected by comparing carbon dioxide emission information data associated with each cutting tool in the determined set of cutting tools, dependent on the selected cutting feature and the selected work-piece material.

According to some embodiments, the electronic device 1a,1b,1c further comprises a memory 103a,103b,103c.

According to some embodiments the processing circuitry 102a,102b,102c is further configured to determine a set of cutting data parameters for the production process based on carbon dioxide emission information data associated with the set of cutting data parameters.

Hence, with this embodiment a machine 50 can be programmed according to the cutting data parameters in order to process the selected work-piece material 70 with the cutting tool for production with a reduced carbon dioxide footprint.

According to some embodiments, the processing circuitry 102a,102b,102c is further configured to cause the electronic device 1a,1b,1c to obtain at least one limiting parameter. The processing circuitry 102a,102b,102c is further configured to determine a set of cutting data parameters taking the at least one limiting parameter into account.

Hence, with this embodiment the set of cutting data parameters can be determined in respect of at least one limitation in the production process.

According to some embodiments the carbon dioxide emission information data associated with each cutting tool 20a,20b,20c,20d is stored in a memory 103a,103b,103c and is associated with a unique machine readable code of an identification marker 40a,40b,40c,40d of each cutting tool 20a,20b,20c,20d.

Hence, with this embodiment each cutting tool is associated with carbon dioxide emission information data and the unique machine readable code enables efficient management of the carbon dioxide emission information data for each tool, and further eliminates the risk of human errors associated with information read by a human such as mixing different tools with different carbon dioxide data.

FIG. 4 illustrates a schematic example how data can be stored and associated in a memory 103a,103b,103c. In FIG. 4 an identification marker is illustrated as being associated with the stored data. In the example the unique machine readable code #AA0002 of the identification marker is associated with the data comprising different amounts of carbon dioxide A-CO2=M, B-CO2=N, C-CO2=O, D-CO2=P and E=CO2=Q.

According to some embodiments the identification marker 40a,40b,40c,40d is a unique machine readable code associated with carbon dioxide emission information data, wherein the carbon dioxide emission information data comprises an individual carbon dioxide emission information data associated with a specific cutting tool 20a,20b,20c,20d. In other words, each identification marker 40a,40b,40c,40d at each tool part 20a,20b,20c,20d is unique so that no other tool part 20a,20b,20c,20d will have the very same identification marker 40a,40b,40c,40d. This enables the identification marker 40a,40b,40c,40d to be associated with individual carbon dioxide emission information data associated with a specific cutting tool 20a,20b,20c,20d.

According to some embodiments the electronic device 1a,1b,1c further comprises a reader device 10a,10b,10c configured to read a machine readable code, arranged at a cutting tool 20a,20b,20c,20d, wherein the reader device 10a,10b,10c is operatively connected to the processing circuitry 102a,102b,102c, and the processing circuitry 102a,102b,102c is further configured to cause the electronic device 1a,1b,1c to determine the set of cutting tools 20a,20b,20c,20d for production from a group of available cutting tools 20a,20b,20c,20d wherein each available cutting tool 20a,20b,20c,20d is identified by, reading, by the reader device 10a,10b,10c, an identification marker 40a,40b,40c,40d at each cutting tool 20a,20b,20c,20d wherein the identification marker 40a,40b,40c,40d is a machine readable code associated with the cutting tool 20a,20b,20c,20d.

Hence, with this embodiment e.g. an operator of a machine can use a reader device and identify the currently available cutting tools at a production location.

Figure 3:
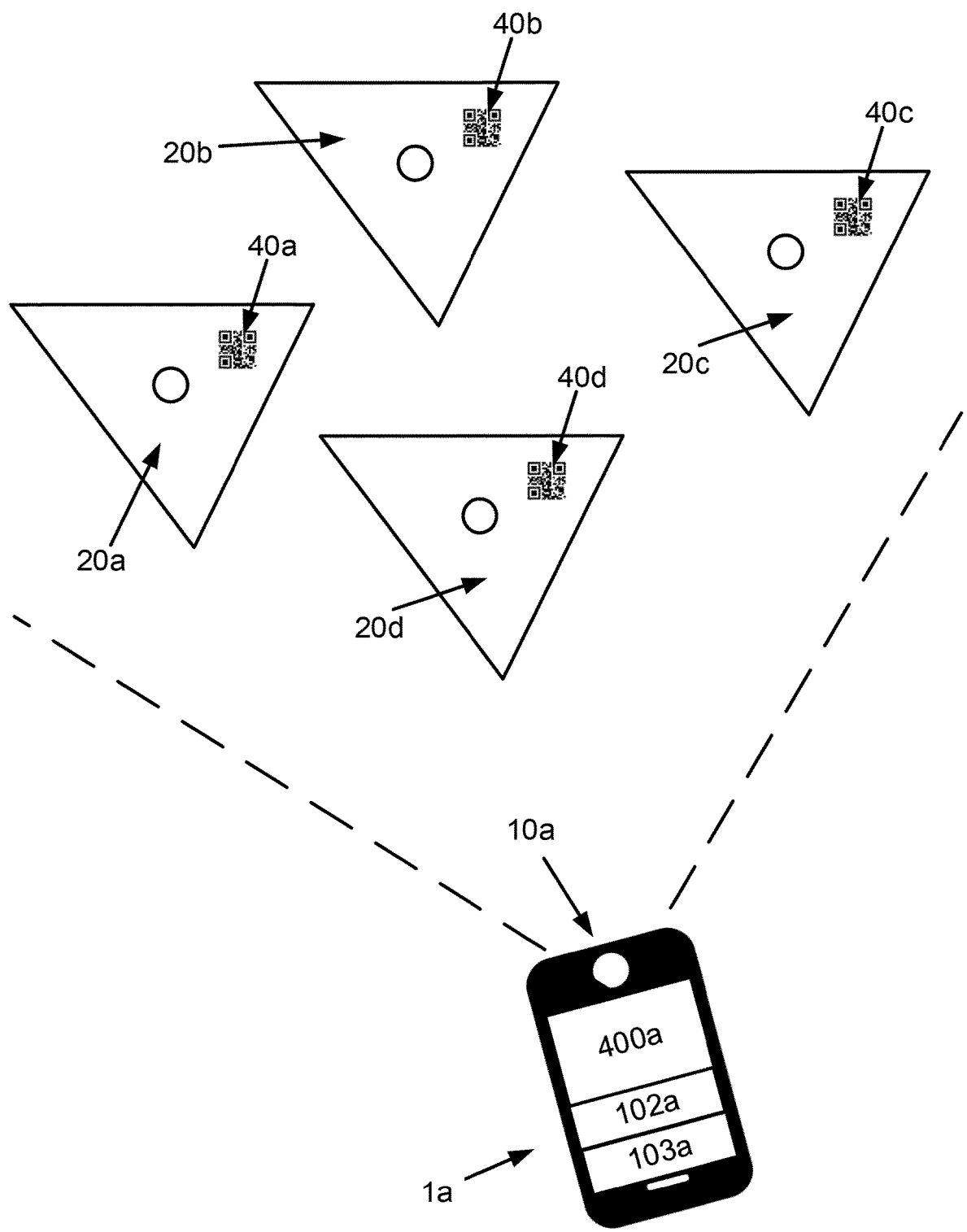
FIG. 3 illustrates an example electronic device with a reader device configured to read a machine readable code, arranged at cutting tools according to embodiments of the present disclosure.

FIG. 3 illustrates an example electronic device 1a with a reader device 10a configured to read a machine readable code 40a,40b,40c,40d, arranged at a cutting tool 20a,20b, 20c,20d according to embodiments of the present disclosure. In the example as illustrated in FIG. 3 the electronic device 1a is a smartphone and the reader device 10a is the camera of the smartphone. The camera 10a reads the machine readable codes 40a,40b,40c,40d of the cutting tools 20a, 20b,20c,20d, in form of cutting inserts, that are in front of the smartphone. Each machine readable code 40a,40b,40c, 40d is associated with the respective the cutting tools 20a,20b,20c,20d that are identified and used for determining the set of cutting tools 20a,20b,20c,20d for production to further determine the cutting tool for production out from the set of cutting tools 20a,20b,20c,20d. In an example, this is particular useful when there are only a limited number of cutting tools 20a,20b,20c,20d available and it is desired to reduce the carbon dioxide footprint of the production process by determining the cutting tool for production based on the available cutting tools 20a,20b,20c,20d.

According to some embodiments the processing circuitry 102a,102b,102c of the electronic device 1a,1b,1c is further configured to obtain the carbon dioxide emission information data associated with the cutting tool 20a,20b,20c,20d from a memory 103a,103b,103c based on the machine readable code associated with the cutting tool 20a,20b,20c, 20d.

Hence, with this embodiment carbon dioxide emission information data is accessible by the electronic device and can be used for determining the cutting tool for production.

According to some embodiments, the carbon dioxide emission information data is obtained by decoding the unique machine readable code of the identification marker 40a,40b,40c,40d and from the decoded information obtain carbon dioxide emission information data.

Hence, with this embodiment information about the carbon dioxide emission can be coded and stored in the unique machine readable code itself that is available on the cutting tool.

According to some embodiments, the carbon dioxide emission information data is obtained by comparing the unique machine readable code with association data and the carbon dioxide emission information data associated with the unique machine readable code is obtained from a memory 103a,103b,103c.

Hence, with this embodiment carbon dioxide emission information data can be stored in a memory that e.g. is a remote memory 103c, and the carbon dioxide emission information data can be stored and managed by a cutting tool manufacturer for a cutting tool customer.

The third aspect of this disclosure shows a computer program product comprising a non-transitory computer readable medium, having thereon a computer program comprising program instructions, the computer program being loadable into a processing circuitry 102a,102b,102c and configured to cause execution of the method when the computer program is run by the processing circuitry 102a, 102b,102c.

The person skilled in the art realizes that the present disclosure is not limited to the preferred embodiments described above. The person skilled in the art further realizes that modifications and variations are possible within the scope of the appended claims. Additionally, variations to the disclosed embodiments can be understood and effected by the skilled person in practicing the claimed disclosure, from a study of the drawings, the disclosure, and the appended claims.

The invention claimed is:

1. A method for reducing a carbon dioxide footprint associated with a production process, wherein the carbon dioxide footprint includes at least an amount of carbon dioxide emitted during the production process, the method comprising:

obtaining a parameter indicative of a selected cutting feature for production by a cutting tool;

obtaining a parameter indicative of a selected work-piece material for production by the cutting tool;

determining a set of cutting tools for production based on the obtained parameters; and determining a cutting tool for production from the determined set of cutting tools based on carbon dioxide emission information data associated with each cutting tool in the determined set of cutting tools, wherein the production process includes plural operations by different cutting tools and the carbon dioxide footprint includes at least a total amount of carbon dioxide emitted during the production process by different cutting tools, and wherein determining each cutting tool for production for each operation in the production process is based on a carbon dioxide contribution by each cutting tool in each operation for reducing a total carbon dioxide footprint for the production process.

2. The method according to claim 1, further comprising determining a set of cutting data parameters for the production process based on carbon dioxide emission information data associated with the set of cutting data parameters.

3. The method according to claim 1, wherein the carbon dioxide emission information data is based on at least any of: a determined time when the cutting tool is required to process the work-piece material; a determined power required to process the work-piece material by the cutting tool; and an energy source composition of one or a plurality of energy sources powering the production process.

4. The method according to claim 1, wherein the carbon dioxide footprint further includes an amount of carbon dioxide emitted before the production process, wherein the carbon dioxide emission information data is based on at least any of an amount of carbon dioxide emitted during manufacturing of the cutting tool, an amount of carbon dioxide emitted during transport of the cutting tool, and an accumulated amount of carbon dioxide emitted during previous processing by the cutting tool.

5. The method according to claim 1, wherein the carbon dioxide emission information data associated with each cutting tool is stored in a memory and is associated with a unique machine readable code of an identification marker of each cutting tool.

6. The method according to claim 1, wherein the cutting tool for production is determined by comparing the carbon dioxide emission information data for each cutting tool in the set of tools for production, and selecting the cutting tool with the lowest amount of carbon dioxide emitted during the production process, or selecting the cutting tool with the lowest total amount of carbon dioxide emitted during the production process and during the manufacturing and/or transport of the cutting tool.

7. The method according to claim 1, wherein the set of cutting tools for production is determined based on available cutting tools from a portfolio of cutting tools, wherein each cutting tool is associated with respective carbon dioxide emission information data.

8. The method according to claim 1, wherein the set of cutting tools for production is determined from a group of available cutting tools and each available cutting tool is identified by reading, by a reader device, an identification marker at each cutting tool wherein the identification marker is a machine readable code associated with the cutting tool.

9. A computer program product comprising a non-transitory computer readable medium, having thereon a computer program comprising program instructions, the computer program being loadable into a processing circuitry and configured to cause execution of the method according to claim 1 when the computer program is run by the processing circuitry.

10. An electronic device for reducing a carbon dioxide footprint associated with a production process, wherein the carbon dioxide footprint includes at least an amount of carbon dioxide emitted during the production process, the electronic device comprising:

a processing circuitry configured to cause the electronic device to:

obtain a parameter indicative of a selected cutting feature for production by a cutting tool;

obtain a parameter indicative of a selected work-piece material for production by a cutting tool;

determine a set of cutting tools for production based on the obtained parameters; and determine a cutting tool for production from the determined set of cutting tools based on carbon dioxide emission information data associated with each cutting tool in the determined set of cutting tools, wherein the production process includes plural operations by different cutting tools and the carbon dioxide footprint includes at least a total amount of carbon dioxide emitted during the production process by different cutting tools, and wherein determining each cutting tool for production for each operation in the production process is based on a carbon dioxide contribution by each cutting tool in each operation for reducing a total carbon dioxide footprint for the production process.

11. The electronic device according to claim 10, wherein the processing circuitry is further configured to determine a set of cutting data parameters for the production process based on carbon dioxide emission information data associated with the set of cutting data parameters.

12. The electronic device according to claim 10, wherein the carbon dioxide emission information data associated with each cutting tool is stored in a memory and is associated with a unique machine readable code of an identification marker of each cutting tool.

13. The electronic device according to claim 10 further comprising: a reader device configured to read a machine readable code, arranged at the cutting tool, wherein the reader device is operatively connected to the processing circuitry, and the processing circuitry is further configured to cause the electronic device to determine the set of cutting tools for production from a group of available cutting tools wherein each available cutting tool is identified by, reading, by the reader device, an identification marker at each cutting tool wherein the identification marker is a machine readable code associated with the cutting tool.

14. The electronic device according to claim 13, wherein the processing circuitry of the electronic device is further configured to obtain the carbon dioxide emission information data associated with the cutting tool from a memory based on the machine readable code associated with the cutting tool.

\* \* \* \* \*